United States Patent
Bolton et al.

(10) Patent No.: US 6,178,160 B1
(45) Date of Patent: Jan. 23, 2001

(54) LOAD BALANCING OF CLIENT CONNECTIONS ACROSS A NETWORK USING SERVER BASED ALGORITHMS

(75) Inventors: Derek W. Bolton, Balmain; Rajesh Agrawal, Wollstonecraft, both of (AU)

(73) Assignee: Cisco Technology, Inc., San Jose, CA (US)

(*) Notice: Under 35 U.S.C. 154(b), the term of this patent shall be extended for 0 days.

(21) Appl. No.: 08/996,683

(22) Filed: Dec. 23, 1997

(51) Int. Cl.[7] .................................................. G06F 9/00
(52) U.S. Cl. ........................ 370/255; 709/105; 709/226
(58) Field of Search .................................. 709/105, 219, 709/233, 226; 710/60; 370/355, 352

(56) References Cited

U.S. PATENT DOCUMENTS

| | | | |
|---|---|---|---|
| 5,530,744 | * 6/1996 | Charalambous et al. | 379/265 |
| 5,774,660 | * 6/1998 | Brendel et al. | 709/201 |
| 5,867,706 | * 2/1999 | Martin et al. | 709/105 |
| 5,916,017 | * 6/1999 | Attanasio et al. | 709/224 |

OTHER PUBLICATIONS

[Anon.], "Cisco Distributed Director," WWW document posted Feb. 21, 1997, pp. 1–16.

Schemers, Roland J.. "Lbnamed, a Load–Balancing Name Server Written in Perl," WWW document listed as last modified on Sep. 17, 1995, pp. 1–5.

* cited by examiner

Primary Examiner—Huy D. Vu
Assistant Examiner—Jasper Kwoh
(74) Attorney, Agent, or Firm—Cesari and McKenna, LLP

(57) ABSTRACT

A plurality of web servers (16, 18, and 20) have a common host name, and their authoritative domain server (24 or 26) responds to requests from a local domain-name server (22) for the network address corresponding to their common host name by making an estimate of the performance costs of adding a further client to each of the web servers and then sending the local domain-name server (22) the network address of the server to which the addition of a further client will result in the least performance cost. The performance cost is defined as the difference in the average number of waiting clients, and it takes into account both the additional response time for existing clients and the projected response time for the prospective new client.

10 Claims, 2 Drawing Sheets

LOAD BALANCING OF CLIENT CONNECTIONS ACROSS A NETWORK USING SERVER BASED ALGORITHMS

BACKGROUND OF THE INVENTION

The present invention is directed to communications networking. It particularly concerns domain-name servers' network-address choices.

For internetwork communications, network nodes typically transmit information in packets. The packet format is specified in part by an applicable network-level protocol, and that format includes a network-address field that identifies a node interface to which the packet is directed. A protocol typically used for this purpose is the Internet Protocol ("IP"), which is defined in the Internet Community's Request for comments ("RFC") 791. The network address is a four-byte (or, in Internet parlance, four-"octet") address. The network address is typically rendered in a literature as the four bytes' respective decimal representations separated by periods, e.g. "142.75.229.5."

But human beings do not ordinarily employ such addresses directly. Instead, they employ host names, which are more often composed of letters, e.g. "hostdomain.com" and are therefore more easily remembered. Once the user gives the host name to his node system, however, that system must translate the name into a network address to perform the actual communication. This necessitates translating from the host name to the internet address. In the usual case, the user's node does not store the necessary translation information locally, so it communicates, typically by means of the DNS (Domain Name System) protocol described in RFCs 1034 and 1035, with a remote domain-name server that has the necessary translation information for the domain involved. When the remote domain-name server receives the DNS request, it looks the submitted domain name up in a table that associates network addresses with host names, and it sends the requested address back to the requesting node.

In most cases, such as in most e-mail operations, there is a one-to-one relationship between a host name and an internet address. But this is not always so. Sometimes the host actually has interfaces on more than one network, and those interfaces would necessarily have different network addresses. Conversely, heavily used "web" sites may actually be implemented more or less identically in several web servers, which should all be identified by the same name (even if the network nodes that embody the servers additionally have different names associated with other services). The present discussion is directed to the latter situation.

In some cases, such commonly named servers are dispersed geographically with the intention of reducing communications costs by having the web clients directed to the nearest application server. In those cases, the name server may select the application server that appears closest to the source of the DNS request, and it gives the selected site's network address as the response to the DNS request. But multiple servers may be required even if there is no such geographical imperative. If a "site" is heavily used, for example, a single host may not be able to handle the load adequately, so multiple hosts would be desirable even if they are not located at any great distance from each other. In such cases, the name server divides the traffic up among the web servers in accordance with a policy intended to be "fair" in some sense.

To this end, a good if not completely accurate assumption is that client-server traffic occurs in transactions. That is, a client that has made a request of the server is assumed to make no further requests until it receives the server's response. The response time, or "latency" between the request and the response is not in general the same for different servers, and one approach to fairness is for the name server to direct the client to the web server whose latency is lowest. To determine that latency, the name server may send each of the commonly named application servers an IP datagram containing an Internet Control Message Protocol ("ICMP") message, described in RFC 792, of the so-called "ping" type. This type of message merely requests that the recipient return a corresponding response to show that it is functioning. The time that elapses between the ping transmission and the resultant response is a rough latency measurement, and the address-requesting client is directed to the web server whose thus-measured latency is lowest.

But there are many situations in which the ping approach does not balance server load particularly well. An apparent reason is that the latency measured by the ping approach does not necessarily correlate well with the latency that the service's clients experience. The client's network distance from a server may differ from the name server's distance. Also, a web server that responds rapidly to a ping request, which is serviced low in its protocol stack, may appear more lethargic in response to, say, a client of its document-retrieval process.

For these or other reasons, superior load balancing more often results from simply allocating load on a weighted random basis. (The weighting is typically based on the sites' respective capabilities.) But that approach's results, too, leave room for improvement.

SUMMARY OF THE INVENTION

I have recognized that superior load balancing will result from basing the server selection on an estimate of the overall performance cost that adding a new client at a given server will exact. That is, over the server's clients, what increase will there be in the number of client-seconds of waiting per unit of elapsed time?

To estimate that cost, each application server measures the times that elapse between its receipt of requests and its transmission of the resultant responses, and it also measures other, presumably related quantities at the same time. From these data a model of the server's transaction processing is derived, and that model is used to project the cost of adding a client to that server.

For example, the application server may measure transaction size, transaction rate, and the number of concurrently served clients that result in an aggregate response time experienced by its clients during each of a number of sample periods. From these data, the application server (or, less typically, the domain-name server) may determine the model parameters that cause the most-accurate output of a parameterized model of the relationship between response time and the other measured quantities. A model using these parameters would then project the performance cost of adding a client to the server for which the model parameters were determined. The name server queries the commonly named sites for their cost estimates or data from which they can be derived, and, all other policy factors being equal, so assigns clients to servers as to minimize the performance cost.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
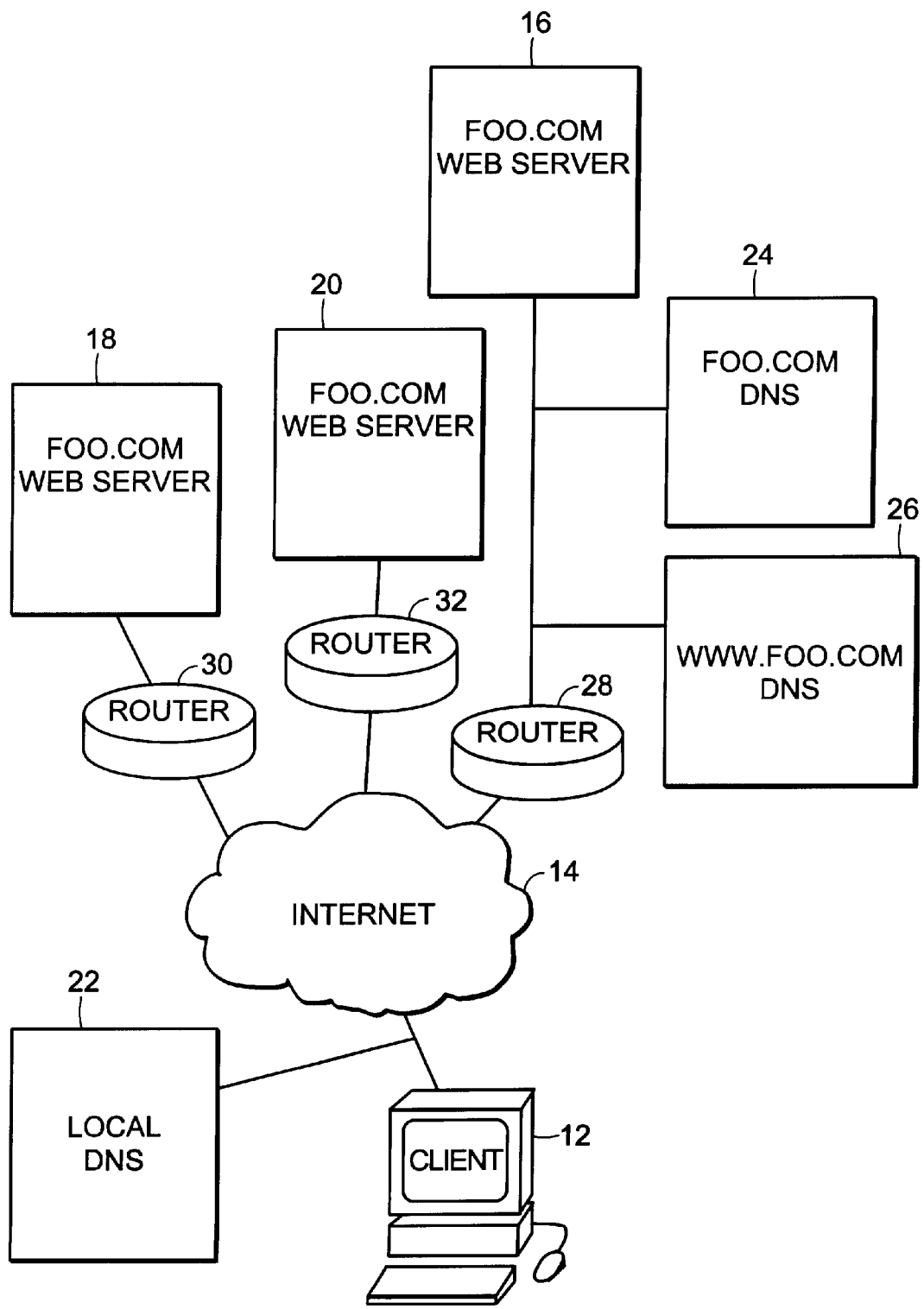
FIG. 1 is a simplified topological diagram of a network in which the present invention's teachings can be employed.

The present invention's teachings can be implemented in an internetworking environment such as that which FIG. 1 depicts. In that drawing, a user at a client system 12 desires access to a service provided by a application server that can be accessed through an internetwork 14. For the sake of concreteness, FIG. 1 depicts that application server as a web server 16, i.e., a system that responds to requests for HTML documents ("web pages"). The present invention's teachings are applicable to situations in which more than one system provides an identical service, and FIG. 1 accordingly depicts two further web servers 18 and 20. Since servers 16, 18, and 20 all provide the same service, the system has been arranged so that a single name e.g., "www.foo.com," represents not only server 16 but also servers 18 and 20. In other words, as far as the user is concerned, he is at the same web site regardless of which server he actually reaches.

As was explained before, the routers that forward communications packets between networks require internetwork addresses rather than host names, so the host name www.foo.com needs to be "resolved" into, e.g., an IP address, such as "271.81.9.3," which uniquely identifies a node interface: it specifies an interface on server 16, 18, or 20 but not on all of them. To obtain such an address, a resolver process in the client system 12 may, say, ask a local domain-name server 22, typically attached to the same local-area network as the client 12, for the IP address associated with the host name www.foo.com.

As those skilled in the art will recognize, domain-name servers have the capability of searching the internetwork to obtain such information. Typically by way of certain intermediate queries, the local domain-name server 22 identifies a remote domain-name server 24 as the authoritative source of IP addresses for names in the foo.com domain. In response, domain-name server 24 may tell domain-name server 22 the IP address of one of the www.foo.com web servers 16, 18, and 20. Alternatively, it may direct domain-name server 22 to treat www.foo.com as a subdomain (as opposed to simply a host name) whose authoritative domain-name server is a further server 26.

In both cases, one of the remote domain-name servers gives the local domain-name server 22 the IP address of one of the www.foo.com web servers 16, 18, and 20. The local domain-name server 22 thereupon gives the client 12 the selected web server's IP address, and the client 12 therefore begins requesting HTML documents from the selected application server.

The present invention concerns the manner in which, say, domain-name server 26 selects the web server 16, 18, or 20 whose address it will send to client 12's local domain-name server 22 when that client needs to know the IP address associated with the host name www.foo.com. To make this selection, domain-name server 26 may implement any one or more of a wide range of load-distribution policies. For example, the domain-name server may use estimates of the relative distances between the client's local domain-name server 22 and the various web servers 16, 18, and 20. To this end, the enterprise that maintains the web site that those web servers provide may install agents in routers 28, 30, and 32 through which traffic reaches web servers 16, 18, and 20, respectively. By monitoring the routing information that routinely passes among internetwork routers, these agents would determine the requested distances.

A domain-name server that employs the present invention's teachings may use information of that or other types in determining which web server's IP address it will send in response to the web site's name. According to the present invention, though, the determination that it makes is a function of at least the performance cost of making such a choice, regardless of whether it additionally bases that determination on such other information. At least to the extent that all other metrics upon which the choice is based are equal, that is, the application server should be so chosen as to minimize the projected resultant increase in total latency per unit elapsed time over all of the service's clients.

For example, suppose that server 18 has 20,000 existing clients and that those clients generate 500 transactions per second among them: each client averages one transaction every 40 seconds. Let us also suppose that selecting server 18 as the one to which client 12 is directed will so increase that server's load as to add one millisecond to each existing client's response time.

This means that the average client will now generate a new transaction every 40.001 seconds: the change in the total transaction rate is negligible. So the total cost for existing clients is 0.001 client-second/transaction×500 transactions/second=0.5 client. For existing clients, that is, an additional 0.5 client-second of waiting will occur during each second of elapsed time.

For comparison, assume that server 16 has one hundred clients, each of which generates a new transaction every 50 seconds, and assume that adding a new client will cost 100 milliseconds on each transaction. This means that the performance cost is 0.2 client as opposed to 0.5 client in the case of server 18. So server 16 provides a clear advantage over server 18 if we restrict our attention to existing clients.

But I have recognized that we should also take into account the effect that the choice of server will have on the latency that the new client experiences. For the sake of this example, let us suppose that the difference between the two servers' transaction rates results from a difference in existing latency. That is, we assume that server 16's clients suffer a latency of 10 seconds more than server 18's do. We therefore assume that a new client on server 16 would also average a new transaction every 50 seconds. So by being connected to server 16, client 12 experiences an additional cost of 10 client-seconds/50 seconds=0.2 client; if we consider only client 12, the choice of server 16 is not as good. On balance, though, the choice of server 16 is still better, since the cost difference of 0.3 client to the existing clients outweighs the cost difference of 0.2 client to client 12.

So the overall cost of selecting this server is:

$$xRate*aRTDelta+rNew*xRateNew, \qquad (1)$$

where xRate is the total transaction rate for all of a server's clients, the increase in average response time that adding one more client will cause is aRTDelta, and the proposed new client would experience a response time of rNew on a transaction rate of xRateNew.

To describe how the illustrated embodiment determines the quantities in equation (1), we define the following statistics relating to a given server:

| | |
|---|---|
| aRT | average response time over all client transactions |
| tTrans | round-trip network transit time between the client and the server |
| aRTup | average "upstream" response time, i.e. excluding tTrans |
| xSize | total number of bytes in an average transaction (in + out) |
| xRate | transaction rate, totaled across clients |
| nClients | number of current clients |
| maxRate | maximum transaction rate (given nClients and xSize) |
| period | sampling period in the server |
| aClients | average number of clients during a sample period |
| nX | number of transactions in a sample period (= xRate * period) |
| tRT | total response time over a sample period (= aRT * nX) |
| tRTup | total upstream response time over a sample period (= aRTup * nX) |
| tClients | aggregate connect time over sample a period (= aClients * period) |
| tBytes | the transaction-data volume, i.e., the total bytes transferred during sample a period (= xSize * nX) |

The approach used in the illustrated embodiment to determine the quantities in equation (1) involves considering the web server as having two operational domains, namely, a load-limited domain and a client-limited domain. In the load-limited domain, it is the rate at which clients generate transactions that limits the total traffic rate: the server has not yet reached maximum throughput. In principle, the response time in this domain should be largely constant but grow rapidly when the traffic approaches maximum throughput. In general:

$$aRT = constant + 1/(maxRate - xRate), \qquad (2)$$

where constant and maxRate both depend on the average transaction size.

But we can approximate a small region in this domain (if it is not too close to the maximum-throughput regime) by the following parameterized model:

$$aRT = a + b^*xSize + c^*xRate \qquad (3)$$

for some unknown parameters a, b, and c.

In principle, an application server that implements the present invention's teachings uses a model such as that of equation (3) to project the increase in the total latency experienced by all existing clients that adding a further client will cause. In a typical implementation, circuitry for performing this function's constituent operations will be provided as communications hardware and one or more processors software-configured to perform these operations, but those skilled in the art will recognize that there is a wide range of circuitry that could be used instead. Also, responsibility for various operations can be divided among software modules in a wide variety of ways. For the sake of simplicity, we describe only one of them below.

Figure 2:
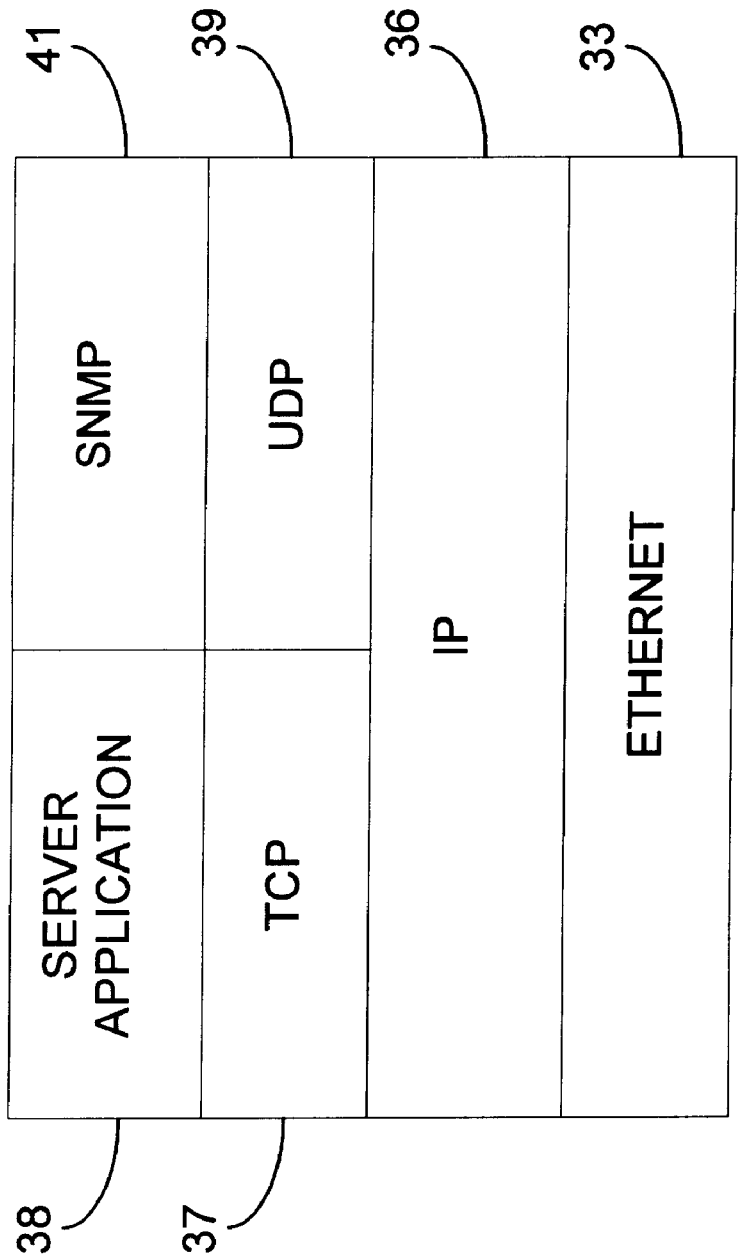
FIG. 2 is a diagram that depicts the relationships among the name-server and the web-server processes in the network of FIG. 1.

We assume that an application server, such as web server 16, performs a number of processes that implement various levels in its protocol stack. Different environments may implement different protocol stacks, but the protocol stack whose relationship to the server application FIG. 2 depicts is typical. Communications that server 16 performs by way of its link with its local router 28 occur by way of a link-level (e.g., Ethernet) process 33, which controls hardware by which the server arbitrates for control of the local link and specifies the interface on that link (typically, that of the router 28) for which the (link-level) frames that it places on the link are intended. Those Ethernet frames' payload is a network-level protocol data unit, typically an IP datagram produced by an IP process 36, which specifies the internetwork address to which the router should send the information. In turn, the payload of at least some IP datagrams is the output of a TCP (Transport Control Protocol) process 37, which performs various tasks that concern low-level session initiation and termination as well as proper ordering and reliable delivery of the IP datagrams' contents. Part of that process's payload is the result of the operations that 38 performs to service client requests for access to various documents.

During message reception these process layers perform operations complementary to those described above for transmission, and the server application 38 or some related process in an application server that implements the present invention's teachings measures the time that elapses between a request message's receipt and the server process 38's resultant response. We note here that the drawing's representation of these functions as being performed in a single process immediately above the TCP or other transport-level process in the process hierarchy is purely arbitrary. A typical arrangement may segregate general server-type functions from those more concerned with the actual web-page application, for instance. Also, certain of these functions could actually be carried out as part of a TCP process adapted to that purpose.

But we refer to the involved processes collectively as the server process 38, which will typically receive a time-of-arrival time stamp from, e.g., the Ethernet or IP process, and take its response as occurring, say, when the server process 38 delivers its response to the TCP process 37. The difference between these times is the involved transaction's response time.

The server process takes these and other data in sample periods. For a given sample period, the server adds together these response times for all transactions with all clients, and during that sample period it similarly takes the other data that the equation (3) model relates to response time. In terms of the quantities that the server process can readily measure, that model is as follows for the load-limited domain:

$$tRT = a^*nX + b^*tBytes + c^*nX^*nX/period \qquad (3')$$

As will be explained below, the parameter values a, b, and c that make the model best fit the data can be determined from at least three samples' worth of these data. Using those parameters, the model can project the impact that adding another client will have on existing clients:

$$aRTDelta = c^*xRate/aClients = c^*nX/tClients \qquad (3a)$$

However, this model's performance deteriorates as the maximum throughput is approached. In that regime, the response time given by equation (2) tends to infinity: Requests are added faster than responses can be generated, so the request queue grows without limit. In practice, the response time is limited by the number of clients: each client essentially waits for each other client to complete one transaction. For this domain, our model is different, but it again depends on transaction size:

$$aRT = a + b^* \, aClients + c^*aClients^*xSize, \qquad (4)$$

or $$tRT = a^*nX + b^*nX^*tClients/period + c^*tBytes^*tClients/period \qquad (4')$$

for a set of parameters a, b, and c that are not in general the same as those that apply to equation (3).

With this model, the impact on existing clients of adding one more is:

$$aRTDelta = b + c*xSize \quad (4a)$$

Although one could employ a model that combines these two domains, the approach that the illustrated embodiment employs is to compute parameters for both models and then determine which model best fits the existing data. So the general scheme for estimating the impact of added load is as follows. First, the server process 40 collects data over several sample periods. Next, it computes the constants that give the best fits to equations (3') and (4'). It then selects the model that gives the least mean-square error. Finally, it extrapolates the cost of adding one further client, assuming that the new client's average transaction size will be that of the existing clients.

The data-collection part of this process involves collecting the following data in each sample:

| nClients | number of current clients on a server |
|---|---|
| period | sampling period in the server |
| nX | number of transactions in a sample period (= xrate * period) |
| tRT | total response time over a sample period (= aRT * nX) |
| tClients | aggregate connect time over a sample period (= aClients * period) |
| tBytes | total bytes transferred during a sample period (= xSize * nX) |

To this end, the server performs the following operations at the beginning of a sample interval:

tClients=−nClients*time tRT=0 tRTup=0 tBytes=0

When a client connects, the server application 38 performs these operations:

nClients=nClients+1;

tClients=tClients−time;

When a client message arrives, the server 38 performs these operations:

startTime[client]=time;

transactionbytes[client]=bytesIn;

When the server application 38 sends out its response, it performs the following operations.

tBytes=tBytes+transactionBytes[client]+bytesOut tRTup=tRTup+time−startTime[client]

nX=nX+1

When a client disconnects, the server 38 performs these operations:

nClients=nClients−1;

tClients=tClients+time;

From the foregoing operations, it can be seen that the illustrated embodiment counts a transaction as occurring in the sample period in which it ends. Of course, this is not a requirement.

A further point to note about the foregoing data is that the response times are computed from the point of view of the server: the response time is the time that elapses between its receipt of the client's request and its delivery of the resultant response to the network-communicating processes. It does not include the transit time from the client through the network to the server and back again. If the latter information is available, we do not compute simply tRTup but instead compute the complete response time tRT:

$$tRT = tRt + time - startTime[client] + tTrans$$

This measures the latency from the client's point of view, which is preferable. Even if that approach is not practiced in a given implementation, though, a good basis on which to balance loads among application servers still results when latency is measured from the server's point of view only. As will be seen below, moreover, there may be situations in which the domain-name server may be able to add the transit-time information if the web server has not done so.

Finally, at the end of the sample period, the server 40 computes the aggregate connect time:

tClients=tClients+nClients*time;

As was stated above, the two models' parameters a, b, and c are determined after data have been taken for a number of periods. For this purpose, we rewrite equations (3') and (4') in the following form:

$$r = a*x + b*y + c*z,$$

where x, y, z, and r are measured variables and a, b, c, are the model parameters to be determined. If the samples taken during the ith period are $x_i$, $y_i$, etc., then, in matrix notation, we want the values a, b, c that come closest to satisfying the following matrix equation:

$$\begin{bmatrix} x_1 & y_1 & z_1 \\ x_2 & y_2 & z_2 \\ x_3 & y_3 & z_3 \\ \vdots & \vdots & \vdots \\ x_n & y_n & z_n \end{bmatrix} \begin{bmatrix} a \\ b \\ c \end{bmatrix} = \begin{bmatrix} r_1 \\ r_2 \\ r_3 \\ \vdots \\ r_n \end{bmatrix}, \quad (5)$$

or:

$$XA = R \quad (5')$$

The mean-square error can be minimized by solving:

$$(X^T X) A = X^T R \quad (6)$$

This equation can be solved so long as the square matrix $X^T X$ is invertible, as it usually is.

To determine which model is superior, we take their respective errors. The measure of the error in solving equation (5') is the sum of the errors of the individual ($r_i$'s):

$$(XA - R)^T(XA - R) = (A^T X^T - R^T)(XA - R) \quad (7)$$
$$= A^T X^T XA - A^T X^T R - R^T XA + R^T R$$
$$= A^T X^T R - A^T X^T R - R^T XA + R^T R$$
$$= R^T R - R^T XA$$

The model that yields the lowest error is then the one used to estimate the performance cost.

As described so far, the errors from all of a fixed number of preceding sample periods are treated equally, and there would be no contributions from any periods earlier than the first of that fixed number. Although that approach can be used, it is more convenient to make a couple of implementation changes whose effects are (1) to "age" the data exponentially and (2) to reduce the computational overhead.

One aging approach is progressively multiplying the data by an aging factor $p<1$:

$$\begin{bmatrix} x_1 & y_1 & z_1 \\ x_2 p & y_2 p & z_2 p \\ x_3 p^2 & y_3 p^2 & z_3 p^2 \\ \vdots & \vdots & \vdots \\ x_n p^{n-1} & y_n p^{n-1} & z_n p^{n-1} \end{bmatrix} \begin{bmatrix} a \\ b \\ c \end{bmatrix} = \begin{bmatrix} r_1 \\ r_2 p \\ r_3 p^2 \\ \vdots \\ r_n p^{n-1} \end{bmatrix} \quad (8)$$

When next sample period ends, we multiply by p and insert the data as a new row in the matrix equations:

$$\begin{bmatrix} x_0 & y_0 & z_0 \\ x_1 p & y_1 p & z_1 p \\ x_2 p^2 & y_2 p^2 & z_2 p^2 \\ \vdots & \vdots & \vdots \\ x_{n+1} p^n & y_{n+1} p^n & z_{n+1} p^n \end{bmatrix} \begin{bmatrix} a \\ b \\ c \end{bmatrix} = \begin{bmatrix} r_0 \\ r_1 p \\ r_2 p^2 \\ \vdots \\ r_{n+1} p^n \end{bmatrix} \quad (9)$$

In matrix notation, where $X_0=[x_0 y_0 z]$:

$$X_{n+1} = \begin{bmatrix} X_0 \\ pX_n \end{bmatrix} \quad (10)$$

and equations (8) and (9) become:

$$X_n A = R_n \quad (8')$$

$$\begin{bmatrix} X_0 \\ pX_n \end{bmatrix} A = \begin{bmatrix} R_0 \\ pR_n \end{bmatrix}, \quad (9')$$

where $R_0 = r_0$.

With the data thus aged, we revisit the question of determining the best fit. To this end, we note:

$$X_{n+1}^T X_{n+1} = [X_0^T \; pX_n^T] \begin{bmatrix} X_0 \\ pX_n \end{bmatrix} \quad (11)$$

$$= X_0^T X_0 + p^2 X_n^T X_n \quad (11')$$

From this observation regarding $X_{n+1}^T X_{n+1}$ and a similar observation regarding $X_{n+1}^T R_{n+1}$ we see that the best fit to equation (9'): is given by solving:

$$(X_0^T X_0 + p^2 X_n^T X_n) A = X_0^T R_0 + p^2 X_n^T R_n \quad (12)$$

Likewise, the measurement error is given by:

$$R_0^T R_0 + p^2 R_n^T R_n - R_0 X_0 A - p^2 R_n X_n A \quad (7')$$

Equations (12) and (7') tell us that we need not retain data for all n sample periods separately. Instead, we need retain only the aggregate variables $X^T X$, $X^T R$, and $R^T R$. At the end of a sample period that has produced new data $R_0$ and $X_0$, we update these variables as follows:

$$X^T X \leftarrow X_0^T X_0 + qX^T X,$$

$$X^T R \leftarrow X_0^T R_0 + qX^T R, \quad (13)$$

and $$R^T R \leftarrow R_0^T R_0 + qR^T R,$$

where $q=p^2$ and $\leftarrow$ denotes the assignment operation.

This approach reduces the number of stored data values from 4n to 9+3+1=13, and it changes the number of computational steps at each sample period from $n^2$ divisions, $2n^2+17n$ multiplications, and $2n^2+12n$ additions to 9 divisions, 98 multiplications, and 70 additions. This is a reduction whenever $n>3$.

Some implementations may so choose the units in which they take the data as to permit the computations to be performed by (less costly) integer arithmetic, possibly with the aid of some rounding logic to deal with the division operations. In support of such approaches, it will be convenient to express or approximate $p^2$, i.e., the square of the aging factor, in the form $$1-m*2^{-n}$$

for some integers m and n. This permits bit shifts to be used in place of multiplication and division. Indeed, it is reasonable to limit the choice to m=1 (with n>1); the value of p would then be chosen from 0.87, 0.93, 0.97, 0.985, .... (The corresponding half-lives of the data would then be 5 periods, 10 periods, 21 periods, etc.)

It is desirable for the sampling period and the aging rate to be configurable at the server. Recommended ranges and defaults for these parameters are:

| Variable | Units | Low | Default | High |
|---|---|---|---|---|
| period | seconds | 5 | 15 | 60 |
| $-\log_2(1-p^2)$ | (none) | 2 | 3 | 8 |

When the server 26 needs to make a choice among the web servers, it either polls the web servers or relies on information that it has obtained by previous polling. In either case, the typical approach to exchanging such information in a TCP/IP environment is for the domain-name server to employ the Simple Network Management Protocol (SNMP), which is routinely employed to exchange management information and is described in RFC 1157. The domain-name server computes the cost for each web server in accordance with equation (1), i.e., cost=xRate*aRTDelta+rNew*xRateNew In a typical implementation, each of the web servers will have already computed the first product, i.e., xRate * aRTDelta, as the incremental impact of adding a new client to that server, and the domain-name server will accordingly have fetched those quantities from the various web servers.

Equivalently, the web servers can send the domain-name server the data from which it can compute these quantities itself.

In that equation's second product, the response time rNew that a new client should expect of a given server depends on the average response time that the server reports. As was mentioned above, the individual web servers will have determined only aRTup, i.e., only the response time from the server's viewpoint. If the domain-name server is additionally capable of estimating the round-trip network transit time between each server and the current client, the latency rNew of the new client will be projected in accordance with:

$$rNew = aRTup + tTrans$$

If the domain-name server does not have access to this information, then rNew is simply equal to aRTup.

To project the new client's transaction rate xRateNew, I prefer to use a common projected rate for all web servers, so I perform the calculation as follows:

$$xRateNew = \frac{\sum xRate}{\sum aClients},$$

where both sums are taken over all of the available servers. (In the course of requesting statistics, the domain-name server may conclude that one or another web server is unavailable, in which case that web server's statistics typically do not go into the calculations.) With this value, the server can use equation (1) to project the performance cost that adding a new client will exact at each server.

In accordance with this computation, the domain-name server identifies the web server to which the addition of a further client will exact the least performance cost, and, at least if all other factors are equal, it sends the client's local domain-name server the IP address of the web server thus identified.

Although the foregoing description has concentrated on a TCP/IP implementation for the sake of example, those skilled in the art will recognize that the invention's teachings can be employed in systems that use other protocol suites, too. Also, there is nothing critical in the particular computational approach given in the example; it is necessary that only some estimate be made of the performance cost of adding a new client, i.e., of the average additional number of waiting clients.

Additionally, those skilled in the art may prefer any one of a number of refinements. The invention can be practiced, for example, without the data aging described above, although I consider such aging to be beneficial. On the other hand, a somewhat more-dynamic aging approach may be preferred. For example, the aging factor can be increased in situations in which the error is large and decreased as the error decreases. Or the aging factor can be increased whenever switching between the load-limited and client-limited models.

From the foregoing description it is apparent that the present invention provides a way of balancing server loads that can be implemented in a wide range of embodiments. It thus constitutes a significant advance in the art.

What is claimed is:

1. In a communications network, a system comprising:
A) a plurality of application servers having different network addresses but sharing a common host name, each said application server including circuitry for communicating over the network with a plurality of clients in transactions consisting of clients' requests and the application server's responses thereto, for measuring delays between requests and respective responses, for determining, as a function of the measured delays, performance-cost estimates representing the estimated increase that adding a further client will cause in the average number of said plurality of clients that are waiting for responses, and for transmitting the network performance-cost estimates over the network; and
B) a domain-name server that includes circuitry for receiving the performance-cost estimates from the application servers, for receiving over the network DNS queries specifying the common host name, for making a choice among the application servers as a function of the performance-cost estimates respectively received therefrom, and for responding to such DNS queries by sending as the DNS response thereto the chosen application server's network address.

2. A system as defined in claim 1 wherein:
A) the performance-cost estimates made by the application servers represent the performance costs to existing clients only; and
B) the domain-name server's circuitry for making a choice among the application servers additionally computes for each application server a projected new-client latency to be experienced by an added client and makes its choice as a function of the sums of the projected new-client latencies and the performance-cost estimates received from the respective application servers.

3. A system as defined in claim 2 wherein:
A) each application server includes circuitry for determining and transmitting to the domain-name server its transaction rate and average number of clients; and
B) the domain-name server's circuitry for making a choice among the application servers computes a total transaction rate by adding together the transaction rates received from all the application servers, computes an average total number of clients by adding together the average numbers of clients received from all the application servers, projects a new-client transaction rate by dividing the total transaction rate by the average total number of clients, and computes each application server's projected new-client latency by multiplying the new-client transaction rate by the respective application server's average response time.

4. A system as defined in claim 1 wherein each application server determines its performance-cost estimate as a function additionally of the application server's number of transactions.

5. A system as defined in claim 1 wherein each application server determines its performance-cost estimate as a function additionally of the application server's transaction-data volume.

6. A system as defined in claim 1 wherein each application server's circuitry for making performance-cost estimates includes circuitry for:
A) computing from the measured delays the total latency for each of a plurality of sample periods;
B) measuring a plurality of operating variables for each of the sample periods;

C) for each of at least one parameterized model of the relationship between total latency and certain of the operational variables, determining the model parameters that result, when the first model using those model parameters is applied to the measured operational variables, in the best fit of the first model's output to the computed total latencies; and D) generating as its performance-cost estimate the increased latency per unit of elapsed time that is predicted, by the model whose output resulting from the model parameters thus determined is the best fit to the total latencies computed for the sample periods, to result from increasing the number of transactions by the average number of transactions per client.

7. A system as defined in claim 6 wherein:

A) the circuitry for measuring a plurality of operating variables for each of the sample periods comprises circuitry for measuring the number of transactions and the transaction-data volume for each of the sample periods; and B) one said model models the relationship that the total latency has to the number of transactions and transaction-data volume.

8. A system as defined in claim 7 wherein:

A) the circuitry for measuring a plurality of operating variables for each of the sample periods comprises circuitry for measuring the client-connect time; and B) another said model models the relationship that the total latency has to the number of transactions, client-connect time, and the transaction-data volume.

9. A system as defined in claim 6 wherein:

A) the circuitry for measuring a plurality of operating variables for each of the sample periods comprises circuitry for measuring the number of transactions, the client-connect time, and the transaction-data volume for each of the sample periods; and B) one said model models the relationship that the total latency has to the number of transactions, the client-connect time, and the transaction-data volume.

10. For responding to a DNS query requesting the network address associated with a host name shared by a plurality of application servers that have different network addresses and communicate over a communications network with pluralities of clients in transactions consisting of clients' requests and the application servers' responses thereto, a method comprising:

A) measuring the delays between requests and respective responses for each of the application servers;

B) determining, as a function of the measured delays, performance-cost estimates for each of the application servers representing the estimated increase that adding a further client thereto will cause in the average number of said plurality of clients waiting for responses therefrom;

C) making a choice among the application servers as a function of the performance-cost estimates.

* * * * *